June 18, 1968  C. D. CHRISTIE  3,388,760
TANDEM AXLE MECHANISM WITH LOCKING TYPE DIFFERENTIAL
Filed Dec. 6, 1965  2 Sheets-Sheet 1
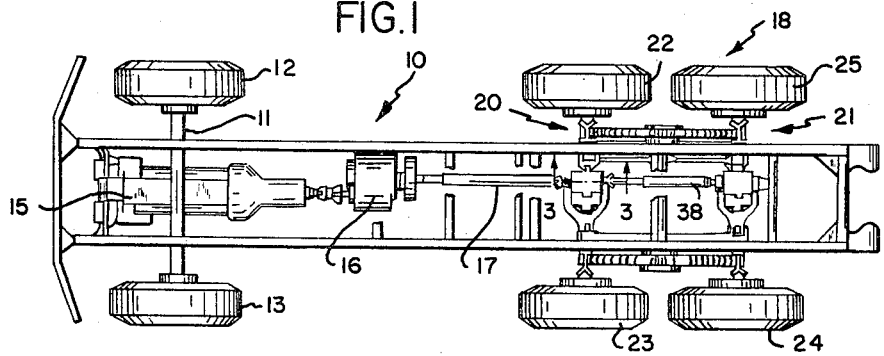
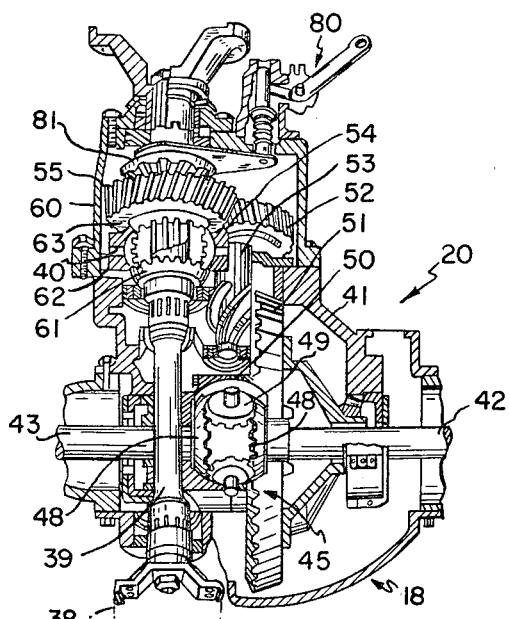
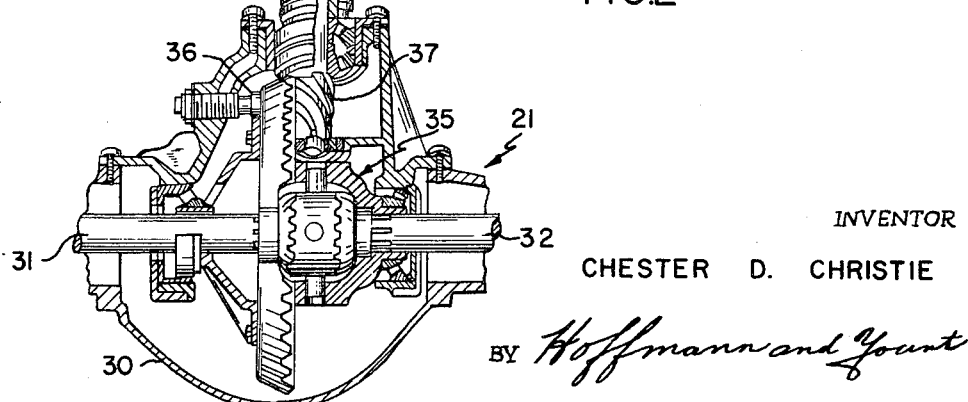
INVENTOR
CHESTER D. CHRISTIE
BY *Hoffmann and Yount*
ATTORNEY June 18, 1968  C. D. CHRISTIE  3,388,760

TANDEM AXLE MECHANISM WITH LOCKING TYPE DIFFERENTIAL

Filed Dec. 6, 1965  2 Sheets-Sheet 2

INVENTOR
CHESTER D. CHRISTIE
BY Hoffmann and Yount
ATTORNEY

United States Patent Office 3,388,760
Patented June 18, 1968

3,388,760
TANDEM AXLE MECHANISM WITH LOCKING
TYPE DIFFERENTIAL
Chester D. Christie, Shaker Heights, Ohio, assignor to
Eaton Yale & Towne Inc., a corporation of Ohio
Filed Dec. 6, 1965, Ser. No. 512,589
12 Claims. (Cl. 180—22)

ABSTRACT OF THE DISCLOSURE

A vehicle axle mechanism comprises a pair of driving axles with an interaxle differential connected therebetween. One of the axles includes a non-locking type of differential which is operable to transmit substantially equal torque to the traction wheels of the vehicle associated with the axle. A second axle includes a locking type of differential which is operable to disconnect one of the traction wheels supported by the second axle when one of the traction wheels of the second axle rotates relative to the other of the traction wheels. The interaxle diffferential is lubricated by means which includes drive elements which drivingly connect the interaxle differential with the non-locking differential so that the interaxle differential is continuously lubricated upon relative rotation of the wheels of the second axle.

---

The present invention relates to an axle mechanism for a vehicle and, more particularly, to a tandem axle mechanism including a plurality of driving axles.

Tandem axle mechanisms comprising a pair of driving axles are used in vehicles and generally each of the driving axles includes a conventional non-locking type of differential connected between shafts drivingly connected with traction wheels to deliver substantially equal torque thereto. In such tandem axle mechanisms, torque delivered thereto is divided between the driving axles by a power divider unit including an interaxle differential connected between the axles. The interaxle differential is also of the non-locking type and is lubricated by a lubricant delivered thereto by gearing associated with a first one of the axles. In such tandem axle arrangements when one wheel of the second one of the axles spins out, all power is delivered thereto and the first axle drive remains completely stationary. This stops the gearing associated with the first axle, thus stopping lubricant flow to the interaxle differential. This, of course, results in excessive wear and damage thereto and greatly shortens the life thereof.

The principal object of the present invention is the provision of a new and improved axle mechanism for a vehicle including tandem driving axles having an interaxle differential connected to deliver power to the driving axles and wherein the axle mechanism is constructed so that lubrication of the interaxle differential continues even though wheels of the vehicle encounter slippery conditions and so that some lateral stability of the vehicle is maintained in slippery conditions.

A further object of the present invention is the provision of a new and improved axle mechanism including tandem driving axles having a power divider comprising an interaxle differential connected to deliver power to the driving axles and associated with one axle to receive lubricant upon rotation of the gear train thereof and wherein the axle which spins out when slippery conditions are encountered is the axle with which the interaxle differential is associated thereby ensuring lubrication of the interaxle differential.

A still further object of the present invention is the provision of a new and improved axle mechanism including tandem driving axles having a power divider comprising an interaxle differential connected to deliver power to the driving axles and associated with one axle to receive lubricant upon rotation of the gear train thereof and wherein the other axle includes a locking or biasing type differential drive mechanism operable to transmit less torque to one wheel thereof upon rotation of the one wheel thereof relative to another wheel thereof, such as occurs when slippery conditions are encountered by the one wheel or when cornering.

Still a further object of the present invention is the provision of a new and improved axle mechanism, as noted in the preceding paragraph, wherein the differential drive mechanism in the axle not associated with the power divider is of the full locking type and is operable to disconnect the drive to one shaft portion of the axle in response to rotational movement thereof relative to the other shaft portion of the axle while maintaining a drive to the other shaft portion of the axle.

Further objects and advantages of the present invention will be apparent to those skilled in the art to which it relates from the following detailed description of the preferred embodiment thereof made with reference to the accompanying drawings forming a part of this specification and in which:

FIG. 1 is a schematic plan view of an automotive vehicle having a tandem axle drive embodying the present invention;

FIG. 2 is a schematic sectional view illustrating elements of the tandem axle drive embodied in the vehicle of FIG. 1;

Figure 3:
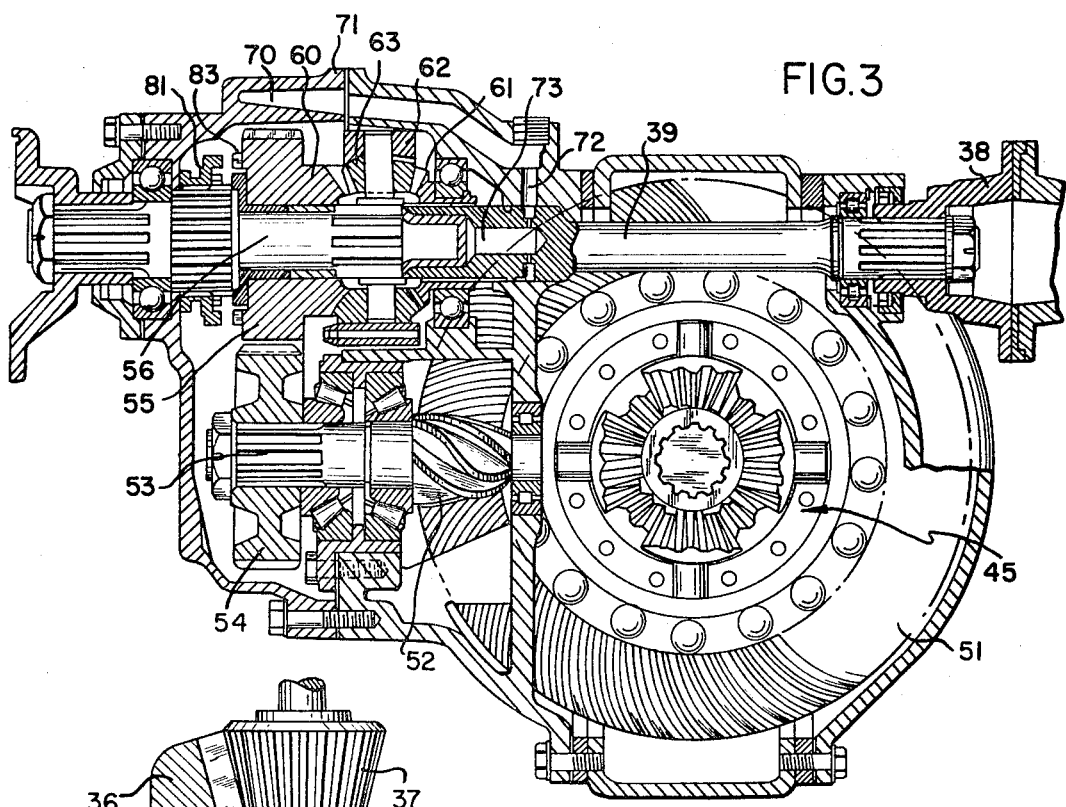
FIG. 3 is a fragmentary sectional view of the drive of FIG. 2, taken approximately along the section line 3—3 of FIG. 1.

The present invention provides a new and improved axle mechanism and, particularly, a new and improved tandem axle mechanism which includes a pair of driving axles interconnected by an interaxle differential which divides the torque delivered thereto between the driving axles. The power delivered to one of the axles to effect rotation thereof causes lubrication of the interaxle differential due to the rotation of a gear train associated with the one axle. Such tandem axle arrangements have been subject to the problem of one axle spinning out and the other axle which is associated with the power divider to provide lubrication thereof then becomes stationary. Of course, when this occurs, the lubricant flow to the power divider stops and thus burn-out of the power divider mechanism may result. The present invention is directed to the solution of this problem and provides a tandem axle mechanism constructed so that the forward axle does not become stationary and lubricant flow to the interaxle differential is maintained when a wheel on the rear axle engages slippery conditions and slips.

The preferred embodiment of the present invention, to be described hereinbelow, is illustrated as incorporated in a six-wheel vehicle, generally designated 10 and illustrated in FIG. 1. The vehicle 10 is a truck tractor and includes a front axle mechanism 11 carrying front wheels 12 and 13 which, of course, are supported so as to effect steering and turning of the vehicle. The vehicle 10 also includes an engine 15 which delivers power through a transmission 16 to a drive shaft 17. The drive shaft 17 delivers power to a rear tandem axle mechanism, generally designated 18.

The rear tandem axle mechanism 18 includes a pair of driving axles, designated 20 and 21. The driving axle 20 will be referred to as the front tandem axle and carries wheels 22 and 23, respectively, at the opposite ends thereof, and the driving axle 21 will be referred to as the rear tandem axle and carries wheels 24 and 25, respectively, at the opposite ends thereof. The axle mechanism 18 includes suitable drive mechanisms, to be described in detail hereinbelow, for transmitting the power delivered by the vehicle drive shaft 17 to the various wheels.

The rear axle 21 is provided with a suitable housing 30 for containing the mechanism by which the driving torque is supplied to the traction wheels 24, 25. The rear axle 21 also includes, in addition to the housing 30, a pair of transversely aligned axle shafts 31, 32 rotatable about a common axis and by which driving torque is delivered to the traction wheels 24, 25, respectively. A differential unit 35 is associated with the shafts 31, 32 and is operable to divide driving torque delivered to the differential unit 35 between the shafts 31, 32. The specific construction and operation of this differential unit will be described in detail hereinbelow. The rear axle 21 may be a multiple speed axle and include suitable drive elements, not shown, and a power shifting mechanism for shifting the drive elements to vary the output speed thereof.

The rear axle 21 also includes power input gearing comprising a ring gear 36 and a driving pinion 37 which comprise part of a drive means for driving the rear axle 21. The driving pinion 37 meshes with the ring gear 36 to drive the ring gear, and the pinion gear 37 is driven by a suitable drive shaft 38 extending between the driving axles 20, 21 and which is drivingly connected with a shaft 39 which is driven by a power divider unit including an interaxle differential 40 to be described hereinbelow.

The front axle 20, like the rear axle 21, includes a housing 41 for containing the mechanism by which driving torque is supplied to the traction wheels 22, 23. The front axle 20, in addition to the housing 41, includes a pair of axle shafts 42, 43, located in a transversely aligned relation and rotatable about a common axis. The axle shafts 42, 43 carry the traction wheels 22, 23, respectively. The front axle 20 also includes a non-locking type differential 45 of a conventional construction and by which the driving torque is delivered to the axle shafts 42, 43 for propelling the traction wheels associated with the axle shafts. Reference may be made to United States Reissue Patent No. Re. 25,269 for details of this structure.

The differential 45, being of a conventional construction, operates to equally divide the torque between the shafts 42, 43 and also permits relative rotation of the axle shafts 42, 43, respectively. Also, since the differential 45 is of the non-locking type, in the event that one of the traction wheels 22, 23 encounters slippery conditions, the differential 45 continues to equally divide the torque between shafts 42, 43 and the wheel which encounters the slippery conditions rotates relative to the other wheel, as is well known. The differential 45 specifically includes side gears 48 fixed on the axle shafts 42, 43 and planet pinions 49 mounted on a carrier spider 50 and having meshed engagement with the side gears 48. The side gears 48 and the planet pinions 49 are of the bevel type, as is well known. The front axle may also be a multiple speed axle and may include conventional drive elements and a power shift mechanism for shifting the drive elements to vary the output speed.

The front axle 20 also includes a drive means for driving the differential 45 from the interaxle differential 40. This drive means comprises a ring gear 51 which is connected with the carrier 50 and drives the carrier 50 of the differential 45. The ring gear 51 is driven by a pinion gear 52 drivingly connected therewith and which is mounted on a shaft 53 rotatably supported in the housing 41. The shaft 53 is drivingly connected with a gear 54 which meshes with a gear 55 rotatably supported on an input shaft 56 of the axle mechanism. The gear 55 is driven by the interaxle differential 40 so as to effect a drive to the differential 45 of the front axle 20.

The interaxle differential 40 is preferably of the non-locking type and includes a pair of side gears, one of which comprises the gear 55 which has a beveled tooth portion 60 functioning as a side gear of the interaxle differential 40. The other side gear of the interaxle differential 40 is designated 61 on the drawings and is drivingly connected with the shaft 39 for delivering power to the rear axle of the axle mechanism 18. The interaxle differential 40 also includes a rotatable carrier or spider 62 and a group of planet pinion gears 63 disposed in meshed engagement with the side gears and supported by the carrier 62. Since the differential 40 is of the non-locking type, in the event that one of the side gears 60, 61 becomes easier to drive, then that side gear rotates faster while the other side gear rotates slower or remains stationary. While the interaxle differential 40 is of the type which equally divides the torque delivered thereto, other types of differentials may be used as an interaxle differential and which may or may not equally divide the torque.

The power, of course, is delivered to the interaxle differential 40 from the vehicle drive shaft 17, and specifically to the shaft member 56 on which the carrier 62 is mounted. Thus, upon rotation of the shaft 56, the carrier 62 is likewise rotated and power is delivered by the differential 40 to the gear 55 and side gear 61. From the description hereinabove, it should be apparent that the side gear 61 and side gear portion 60 of the gear 55 constitute the power output members of the interaxle differential, and the power delivered to the gear 55 is transmitted to the front axle differential 45 and thereby to the traction wheels 22, 23 carried by the axle 20. Moreover, the power delivered to the side gear 61 by the interaxle differential 40 is carried through the drive means including the shaft 39 to the pinion 37 and the ring gear 36 associated with the differential 35 and delivered by the differential 35 to the wheels 24, 25 of the rear axle mechanism.

The front axle 21 includes means providing for lubricating the interaxle differential 40. The means for lubrication of the interaxle differential 40 includes, as is well known, a drum forming a part of the ring gear 51 or otherwise rotates therewith, and which rotates in a reservoir of lubricant when the front axle 20 is driven, and the lubricant is transferred from the drum to the gears 54, 55. The lubricant is carried by the gears 54, 55 toward the interaxle differential 40, and specifically lubricant is carried into a lubricating channel 70 located in an upper housing portion 71 of the front axle, as seen in FIG. 3. The channel 70 communicates with a fluid passageway 72 which, in turn, communicates with a fluid passage 73 located on the common axis of the shafts 56, 39. Lubricant delivered to the passage 73 is delivered or thrown out into the interaxle differential 40 and thereby effects lubrication thereof. It should be apparent, of course, that if the gears 54, 55 do not rotate, no lubricant is delivered into the channel 70 and thereby lubrication of the interaxle differential 40 will cease.

A conventional interaxle differential lock-out mechanism, generally designated 80, is associated with the interaxle differential 40. The differential lock-out mechanism 80 is operable to render the interaxle differential inoperable and provides a drive straight through from the vehicle drive shaft 17 to the differential 45, 35. The differential lockout mechanism is illustrated in the aforementioned reissue patent. The interaxle differential lock-out mechanism 80 is conventional and includes a sleeve member 81 which is splined to a portion of the shaft 56 and is driven thereby. The sleeve 81 is slidable along the shaft 56 into cooperating engagement with gear teeth 83 on the gear 55, thereby directly driving the gear 55 from the shaft 56. When the gear 55 is directly driven from the shaft 56, the gear 55, of course, directly drives the front axle. At the same time, the gear 55 will drive the side gear 61 which, in turn, drives the shaft 39 to drive the rear axle. Thus, the axles will be drivingly connected in a fixed manner rather than through the differential mechanism 40 and thereby the axles will be driven in a fixed ratio.

In accordance with the present invention, the axle mechanism 18 is constructed so as to provide for lubrication of the power divider unit 40 at all times and even when the wheels of the axles encounter slippery conditions and slip. Specifically, the continuance of the lubrication of the interaxle differential 40 is provided by utilizing for the differential mechanism 35 a locking or biasing-type differential mechanism in the rear axle. A locking or biasing-type differential mechanism transmits more driving torque to one of the wheels 24, 25 driven by the rear axle when the other wheel slips and less torque to the slipping wheel, as opposed to the more conventional or non-locking type of differential wherein equal torque is delivered to the wheels.

The biasing type of differential is the so-called limited slip type of differential, and one type of such differential is illustrated in United States Patent No. 3,052,137, issued to Russell. In such a differential, not shown, the axial thrust of a side gear applies a friction clutch to positively drive the side gear with the ring gear of the differential. In such a differential, the wheel which encounters slippery conditions receives less torque and the slower rotating wheel receives more torque.

Preferably, a full-locking type differential is incorporated in the rear axle 21, and the differential mechanism 35 is of the full-locking type and is operable when one of the shafts 31, 32 rotates relative to the other to disconnect the shaft which is overrunning the other from the drive and to maintain the shaft disconnected until the disconnected shaft rotates again at the speed of the other shaft. In this manner, in the event that one of the wheels 24, 25 of the rear axle encounters slippery conditions, all of the torque delivered to the rear axle will not be delivered to the spinning wheel or wheel which has encountered slippery conditions. By disconnecting the slipping wheel, the torque or power delivered by the interaxle differential 40 to the rear axle is delivered by the full-locking type differential 35 to the other wheel or non-slipping wheels. The interaxle differential 40 thus continues to divide the torque delivered to it between the rear axle and the front axle and lubricant continues to be delivered to the interaxle differential.

It should thus be apparent that lubrication of the interaxle differential 40 continues even though one of the rear wheels has encountered a slippery condition. Moreover, in the event that one of the wheels at the front axle encounters a slippery condition, the interaxle differential 40 continues to deliver power thereto, although the differential mechanism 45 operates to deliver the power to the slipping wheel. In any event, the differential 40 will continue to be lubricated due to the fact that the gear train including gears 55, 54 is rotating to deliver the lubricant to the power divider 40.

The full-locking type differential mechanism 35 which is incorporated in the rear axle 21 and which is operable to disconnect one of the rear axle wheels when it rotates relative to the other, as when cornering or when one of the wheels encounters a slippery condition, as noted hereinabove, does provide for maintaining a continued lubrication of the interaxle differential unit 40 and thereby provides an improved axle mechanism. The particular detailed construction of the full-locking type differential 35 does not form a specific part of the present invention and any of the various full-locking type differential units which operate in a manner similar to that of the unit 35 may be incorporated in the axle 21 so as to transmit more torque to the nonslipping wheel and less to the slipping wheel. For a detailed description of a differential unit of the locking type which may be incorporated herein, reference may be made to United States Patent No. 2,329,059, in which a differential unit 35, similar to that incorporated in the axle mechanism 21, is disclosed.

The differential unit 35, in general, includes a spider member 95 mounted in a housing which rotates upon rotation of the ring gear 36. The spider 95 is provided on opposite axial faces thereof with driving clutch teeth 96 that engage driven clutch teeth formed on two driven associated clutch members 97, one of which is associated with the shaft 31 and one of which is associated with the shaft 32. Each of the driven clutch members 97 is mounted on a sleeve 98 and is slidable therealong by the provision of splines on the driven clutch members 97 and cooperating splines on the sleeve members 98. The sleeve members 98 are preferably provided with a second set of splines that engage splines on the shafts 31, 32, though the sleeve members 98 may be keyed to the shafts or otherwise secured thereto. Thus, upon rotation of the spider 95, the drive is transmitted through the members 97 and 98 to the respective shafts 31, 32.

Figure 4:
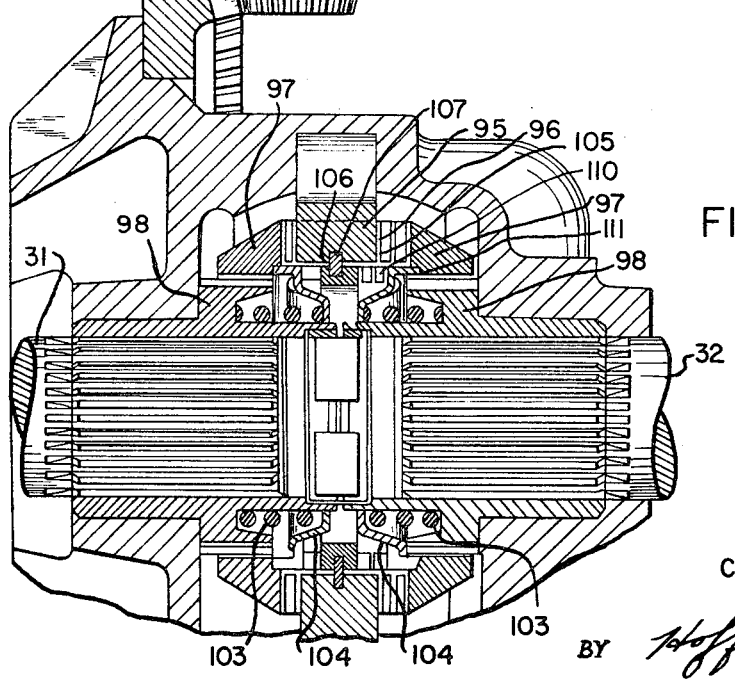
FIG. 4 is a fragmentary sectional view of a portion of the tandem axle drive of FIG. 2.

Upon relative rotation of one of the shafts 31, 32 relative to the other shaft, the shaft which is rotated relative to the other one is disconnected by the differential 35 from a positive drive and all of the drive delivered to the differential 35 is delivered to the connected shaft. Specifically, in the event that the shaft 32 rotates relative to the shaft 31, such as when wheel 25 connected with shaft 32 slips, the clutch member 97 associated with the shaft 32 slides axially outwardly along its associated sleeve member 98, as shown in FIG. 4. This movement compresses one of two coiled springs 103 which react between the sleeve members 98 and a spring retainer 104.

The outward movement of the clutch member 97 is effected by cam teeth 105 formed on a clutch-disengaging member 106 mounted within the spider or driving clutch 95. The clutch-disengaging member 106 is rotatable relative to the spider 96 but is prevented from axial movement relative thereto by a suitable snap ring 107. The cam teeth 105 on the clutch-disengaging member 106 engage cam teeth 110 on a part 111 of the driven clutch member 97. The coaction being such that when there is relative rotation between the shafts 31, 32, a declutching action is effected.

From the above description, it should be readily apparent that in the event one of the wheels of the rear axle begins slipping, that particular wheel will be disconnected from a positive drive by the action of the full-locking type differential unit 35 and all of the torque delivered to the rear axle will be transmitted to the other wheel of the axle, thus preventing a complete spin-out of the rear axle and thus the interaxle differential 40 will continue to deliver torque to both the rear axle and the front axle. In the event that one wheel of the front axle engages slippery conditions and slips, substantially all of the power delivered to the interaxle differential 40 will be delivered to the front axle, and substantially all of the power delivered to the front axle will be delivered to the spinning wheel. However, the drive from the interaxle differential will be such that lubricant will continue to flow to the interaxle differential 40. In this case, the interaxle differential lockout mechanism 80 may be actuated in order to transmit torque to the rear driving wheels. Moreover, in the event that extremely slippery conditions are encountered by all of the wheels of the vehicle, at least one wheel of the rear wheel driving axle will not be powered, thus providing some lateral stability for the vehicle. Furthermore, in cornering, the outside rear wheel will not be driven and will maintain vehicle stability assuming that it has a good traction with the surface which it engages.

Moreover, the use of the locking or semilocking type of differential in the rear axle, as described hereinabove, is believed to facilitate steering of the vehicle. With this locking type of differential installed in the rear axle, when cornering, the outside wheel of the rear axle rotates relative to the inside wheel and is disconnected from a direct drive; thus all of the drive to the rear axle will be on the inside wheel thereof. This causes with most types of suspension for the axle mechanism a slight forward movement of the inner wheel of the rear axle with respect to the frame. This action is believed to help cornering of the vehicle and steering thereof. The use of such a locking type differential in each axle, however, would tend to resist cornering, since all drive would then be on the inside wheels of the vehicle.

In view of the foregoing, it is believed apparent that applicant has provided a new and improved axle mechanism which has been described in great detail hereinabove. It should be apparent, however, that certain modifications, changes, and adaptations may be made therein by those skilled in the art to which it relates, and it is intended hereby to cover all such modifications, changes, and adaptations, which come within the scope of the appended claims.

What is claimed is:

1. An axle mechanism comprising first and second driving axles, said first driving axle including a pair of shafts interconnected by a first differential drive means having an input member and a pair of output members connected with said pair of shafts respectively and effective to transmit substantially equal torque to both of said shafts when one of said shafts has less resistance to rotation and rotates relative to the other of said shafts, said second driving axle including a pair of axle shafts, a second differential drive means for transmitting less torque to one of said last-mentioned shafts when one of said last-mentioned shafts rotates relative to the other of said last-mentioned shafts, said second differential drive means having an input member and a pair of output members connected with said pair of shafts respectively, a power divider having a pair of output members, first drive means drivingly connecting one output member of said power divider with the input member of said first differential drive means, and second drive means connecting said input member of said second differential drive means with the other output member of said power divider.

2. An axle mechanism comprising first and second driving axles, said first driving axle including a pair of shafts interconnected by a first differential drive means having an input member and a pair of output members connected with said pair of shafts respectively and effective to transmit substantially equal torque to both shaft members when one of said shafts has less resistance to rotation and rotates relative to the other of said shafts, a power divider having a pair of output members, first drive means drivingly connecting one output member of said power divider with said input member of said first differential drive means, means providing for lubrication of said power divider including at least a portion of said first drive means, said second driving axle including a pair of axle shafts interconnected by a second differential drive means for transmitting less torque to one of said last-mentioned shafts when said one of said last-mentioned shafts rotates relative to the other of said last-mentioned shafts, said second differential drive means having an input member and a pair of output members connected with said pair of shafts respectively, and second drive means connecting said input member of said second differential drive means with the other output member of said power divider.

3. An axle mechanism comprising first and second driving axles, said first driving axle including a pair of shafts interconnected by a first differential drive means having an input member and a pair of output members connected with said pair of shafts respectively and effective to transmit substantially equal torque to one shaft thereof when said one shaft has less resistance to rotation and rotates relative to the other shaft, an interaxle differential drive means having a pair of output members, first drive means drivingly connecting one output member of said interaxle differential drive means with said input member of said first differential drive means, means providing for lubrication of said interaxle differential drive means including at least a portion of said first drive means, said second driving axle including a pair of axle shafts interconnected by a second differential drive means having an input member and a pair of output members connected with said pair of last-mentioned shafts respectively and including means operable to disconnect the drive to one of said last-mentioned shafts when said one shaft moves relative to the other of said last-mentioned shafts, and second drive means connecting said input member of said second differential drive means with the other output member of said interaxle differential drive means.

4. An axle mechanism comprising first and second driving axles, said first driving axle including a pair of shafts interconnected by a first differential drive means having an input member and a pair of output members connected with said pair of shafts respectively and effective to transmit substantially equal torque to one shaft thereof when said one shaft has less resistance to rotation and rotates relative to the other shaft, an interaxle differential drive means having a pair of output members, first drive means drivingly connecting one output member of said interaxle differential drive means with said input member of said first differential drive means, means providing for lubrication of said interaxle differential drive means including gearing forming a portion of said first drive means and which transmits lubricant delivered thereto to said interaxle differential drive means, said second driving axle including a pair of axle shafts interconnected by a second differential drive means having an input member and a pair of output members connected with said last-mentioned pair of shafts respectively and including means operable to disconnect the drive to one of said last-mentioned shafts when said one of said last-mentioned shafts moves relative to the other of said last-mentioned shafts, and second drive means connecting said input member of said second differential drive means with the other output member of said interaxle differential drive means.

5. An axle mechanism comprising first and second driving axles, said first driving axle including a pair of shafts interconnected by a first differential drive means having an input member and a pair of output members connected with said pair of shafts respectively and effective to transmit substantially equal torque to both shafts when one of said shafts has less resistance to rotation and rotates relative to the other of said shafts, an interaxle differential drive means having a pair of output members and operable to transmit substantially equal torque to both of said input members thereof when the one output member has less resistance to rotation and moves relative to the other output member, first drive means drivingly connecting one output member of said interaxle differential drive means with said input member of said first differential drive means, means proviidng for lubrication of said interaxle differential drive means including at least a portion of said first drive means, said second driving axle including a pair of axle shafts interconnected by a second differential drive means having an input member and a pair of output members connected with said last-mentioned pair of shafts respectively and effective to transmit less torque to one of said last-mentioned shafts when one of said last-mentioned shafts moves relative to the other of said last-mentioned shafts, and second drive means connecting said input member of said second differential drive means with the other output member of said interaxle differential drive means.

6. An axle mechanism comprising first and second driving axles, said first driving axle including a pair of shafts interconnected by a first differential drive means having an input member and a pair of output members connected with said pair of shafts respectively and effective to transmit substantially equal torque to both shafts when one of said shafts has less resistance to rotation and rotates relative to the other of said shafts, an interaxle differential drive means having a pair of output members and operable to transmit substantially equal torque to one of said output members thereof when the one output member has less resistance to rotation and moves relative to the other output member, first drive means drivingly connecting the one output member of said interaxle differential drive means with said input member of said first differential drive means, means providing for lubrication of said interaxle differential drive means including at least a portion of said first drive means, said second driving axle including a pair of axle shafts interconnected by a second differential drive means having an input member and a pair of output members connected with said last-mentioned pair of shafts respectively and including means operable to disconnect the drive to one of said last-mentioned shafts when one of said last-mentioned shafts moves relative to the other of said last-mentioned shafts, and second drive means connecting said input member of said second differential drive means with the other output member of said interaxle differential.

7. An axle mechanism comprising first and second driving axles, said first driving axle including a pair of shafts interconnected by a first differential drive means having an input member and a pair of output members connected with said pair of shafts respectively and effective to transmit substantially equal torque to one shaft thereof when said one shaft has less resistance to rotation and rotates relative to the other shaft, an interaxle differential drive means having a pair of output members and operable to transmit substantially equal torque to one of said output members when the one output member has less resistance to rotation and moves relative to the other output member, first drive means drivingly connecting the one output member of said interaxle differential drive means with said input member of said first differential drive means including gearing forming a portion of said first drive means and operable to carry lubricant delivered thereto to said interaxle drive means, said second driving axle including a pair of axle shafts interconnected by a second differential drive means having an input member and a pair of output members connected with said last-mentioned pair of shafts respectively and including means operable to disconnect the drive to one of said last-mentioned shafts when one of said last-mentioned shafts moves relative to the other of said last-mentioned shafts, and second drive means connecting said input member of said second differential drive means with the other output member of said interaxle differential.

8. A vehicle axle mechanism comprising first and second driving axles, said first driving axle including a pair of shafts carrying traction wheels and interconnected by a first differential drive means having an input member and a pair of output members connected with said pair of shafts respectively and effective to transmit substantially equal torque to one shaft thereof when said one shaft has less resistance to rotation and rotates relative to the other shaft, an interaxle differential drive means having a pair of output members and operable to transmit substantially equal torque to one of said output members thereof when the one output member has less resistance to rotation and moves relative to the other output member, first drive means drivingly connecting one input member of said interaxle differential drive means with said input member of said first differential drive means, means providing for lubrication of said interaxle differential drive means including at least a portion of said first drive means, said second driving axle including a pair of axle shafts interconnected by a second differential drive means having an input member and a pair of output members connected with said last-mentioned pair of shafts respectively and including means for disconnecting the drive to one of said last-mentioned shafts when one of said last-mentioned shafts moves relative to the other of said last-mentioned shafts, and drive means interconnecting the input member of said second differential drive means with the other output member of the interaxle differential drive means.

9. An axle mechanism comprising first and second driving axles, said first driving axle including a pair of shafts carrying ground-engaging traction wheels and interconnected by a first differential drive means having an input member and a pair of output members connected with said pair of shafts respectively and effective to transmit substantially equal torque to one shaft thereof when said one shaft has less resistance to rotation and rotates relative to the other shaft, an interaxle differential drive means having a pair of output members and operable to transmit substantially equal torque to one of said output members thereof when the one output member has less resistance to rotation and moves relative to the other output member, first drive means drivingly connecting one output member of said interaxle differential drive means with said input member of said first differential drive means, means providing for lubrication of said interaxle differential drive means including a pair of gears forming a portion of said first drive means and operable to carry lubricant toward said interaxle differential drive means upon rotation thereof, said second driving axle including a pair of axle shafts carrying ground-engaging traction wheels and interconnected by a second differential drive means, said second differential drive means having an input member and a pair of output members connected with said last-mentioned pair of shafts respectively and including means operable to disconnect the drive to said one of said last-mentioned shafts when one of said last-mentioned shafts moves relative to the other of said last-mentioned shafts, and second drive means connecting said input member of said second differential drive means with the other output member of said interaxle differential drive means.

10. An axle mechanism as defined in claim 9 further including an interaxle differential lock-out mechanism operatively associated with said interaxle differential and actuatable to prevent said interaxle differential from performing a differentiating operation so that the output members of said differential drive are in a fixed relationship.

11. A vehicle axle mechanism comprising first and second driving axles, at least a pair of traction wheels supported by each of said driving axles, a first non-locking differential incorporated in said first axle and operable to provide for relative rotation of the traction wheels supported by said first axle, a second full-locking differential incorporated in said second axle and operable to disconnect one of the traction wheels supported by said second axle when said one of the traction wheels rotates relative to the other, an interaxle differential of the non-locking type connected by said first and second axles and operable to provide for relative rotation thereof and to deliver power to said first differential upon relative rotation of the wheels of said second axle.

12. A vehicle axle mechanism as defined in claim 11 further including means for delivering lubricant to said interaxle differential including drive elements rotatable upon the delivery of power to said first differential whereby said interaxle differential continues to be lubricated upon relative rotation of the wheels of said second axle.

References Cited

UNITED STATES PATENTS

| Re. 25,269 | 10/1962 | Christie | 180—22 |
| 2,667,087 | 1/1954 | Myers | 74—650 |
| 2,830,466 | 4/1958 | Myers | 74—650 |
| 2,870,854 | 1/1959 | Reese | 180—22 |
| 3,191,708 | 6/1965 | Simonds et al. | 180—24 X |

A. HARRY LEVY, *Primary Examiner.*

UNITED STATES PATENT OFFICE
CERTIFICATE OF CORRECTION

Patent No. 3,388,760                 June 18, 1968

Chester D. Christie

It is certified that error appears in the above identified patent and that said Letters Patent are hereby corrected as shown below:

Column 8, line 45, "input" should read -- output --; line 50, "proviidng" should read -- providing --.

Signed and sealed this 18th day of November 1969.

(SEAL)
Attest:

Edward M. Fletcher, Jr.

Attesting Officer

WILLIAM E. SCHUYLER, JR.

Commissioner of Patents